No. 728,330. PATENTED MAY 19, 1903.
J. & J. R. TEMPERLEY & T. S. MILLER.
SEA ANCHOR.
APPLICATION FILED MAR. 21, 1902.
NO MODEL. 2 SHEETS—SHEET 1.

WITNESSES:
J. B. McGirr.
H. L. Reynolds.

INVENTORS
Joseph Temperley
John Ridley Temperley
Thomas Spencer Miller
by Gifford & Bull
their attorneys.

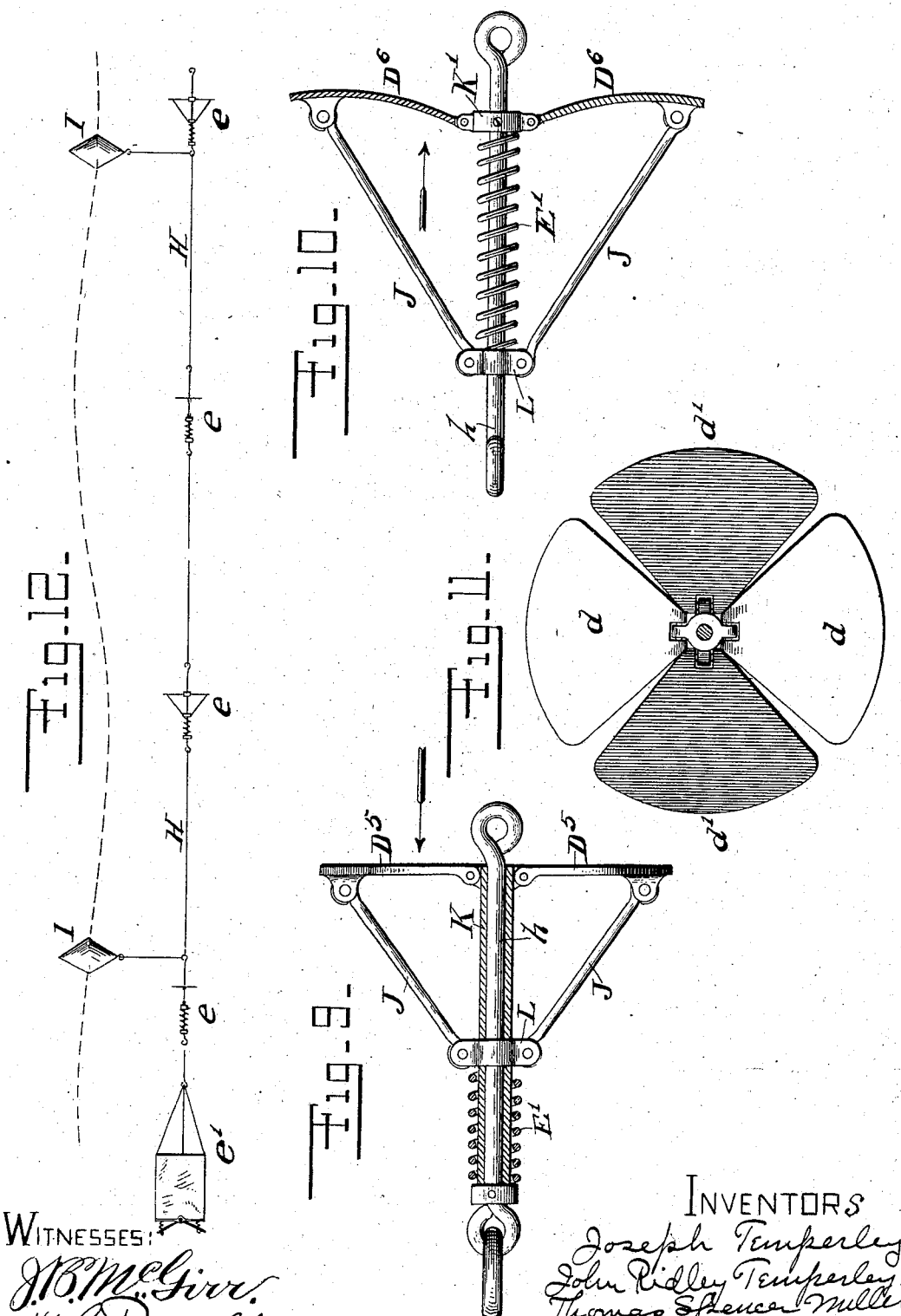

No. 728,330. Patented May 19, 1903.

UNITED STATES PATENT OFFICE.

JOSEPH TEMPERLEY, OF LONDON, AND JOHN R. TEMPERLEY, OF BROMLEY, ENGLAND, AND THOMAS SPENCER MILLER, OF SOUTH ORANGE, NEW JERSEY.

SEA-ANCHOR.

SPECIFICATION forming part of Letters Patent No. 728,330, dated May 19, 1903.

Application filed March 21, 1902. Serial No. 99,320. (No model.)

*To all whom it may concern:*

Be it known that we, JOSEPH TEMPERLEY, residing in London, and JOHN RIDLEY TEMPERLEY, residing at Bromley, county of Kent, England, subjects of the King of Great Britain, and THOMAS SPENCER MILLER, a citizen of the United States, residing at South Orange, Essex county, New Jersey, have invented a new and Improved Sea-Anchor, of which the following is a full, clear, and exact description.

Our invention relates to an improvement in sea anchors or drags whereby a substantially uniform resistance is produced at varying speeds.

Our invention comprises certain parts and combination of parts, which will be particularly pointed out in the claims.

The drawings accompanying herewith and forming a part of this specification show various of the preferred means employed by us in carrying out our invention. We are aware, however, that other means than those shown may be employed and do not wish to be limited to the exact means herein shown and described.

Figure 1:
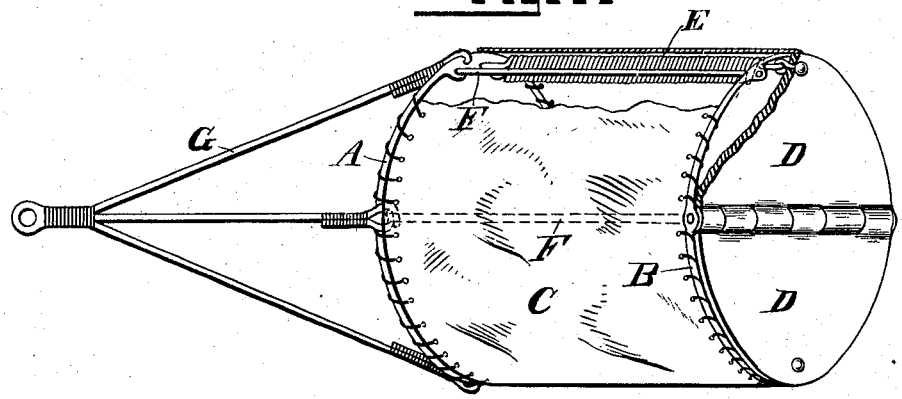

Figure 1 shows in perspective one form of our construction. Figs. 2 to 8, inclusive, show constructions varied slightly therefrom. Figs. 9 and 10 show two forms of drags or anchors somewhat like each other, but differing considerably in appearance from those shown in the preceding figures. Fig. 11 is an end view of two anchors such as shown in Figs. 9 and 10, one behind the other. Fig. 12 illustrates the method of employing these anchors in series.

In employing a sea anchor or drag for maintaining a strain upon a rope or cable we have found it desirable to employ a number of drags connected in series with the same line rather than a single large anchor. This arrangement, besides making the anchors smaller and more convenient to handle, makes a steadier device, as each individual anchor is steadied against side movements by all the anchors behind it. We have also found it desirable in order to secure an approximately uniform resistance at variable speeds to employ retarding-surfaces which are adjustable in angle under the influence of and in a ratio to the resistance of the water thereto. In combination with such a construction it is possible to secure increased steadiness of draft by using a rudder sidewise from the line of draft. Such a device is shown in various modified forms in Figs. 1 to 8, inclusive. The devices shown in these figures, broadly considered, each consist of a hollow structure of any desired section, open at the forward end and provided at or near the rear end with doors or valves which may open for the escape of the water and springs or equivalent devices connected with said doors or valves and acting to close them.

As shown in Fig. 1, the hollow structure consists of two iron rings A and B, connected by rods F and covered with canvas C. This is provided with ropes or rods G, by which it may be towed through the water. The rear end of this hollow structure is closed by two semicircular doors D D, pivoted on a diameter and held closed by springs E, which extend to the forward ring A.

Figure 3:
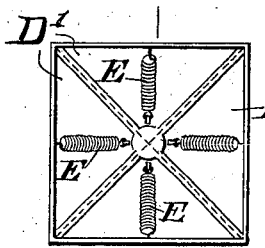
Figure 2:
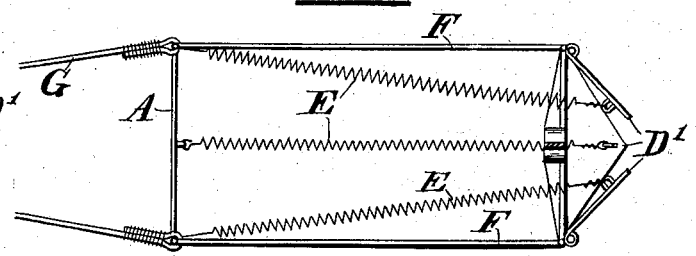
Figure 5:
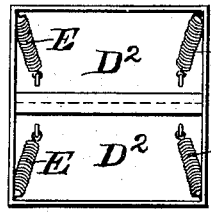
Figure 4:
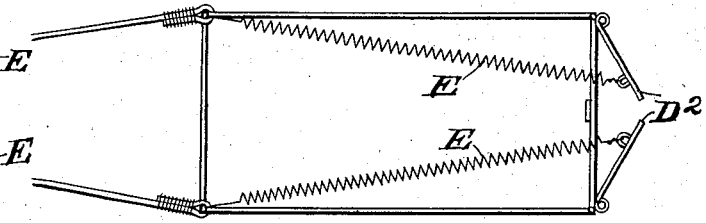

As shown in Figs. 2 and 3, the structure is the same, except that the body is square instead of round, and the valves D' D' are of triangular shape and are hinged upon the sides instead of in the center of the body. The structure shown in Figs. 4 and 5 is like that shown in Figs. 2 and 3, except that two rectangular valves $D^2$ $D^2$ are used, which are hinged upon opposite sides.

Figure 7:
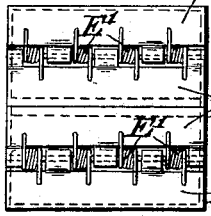
Figure 6:
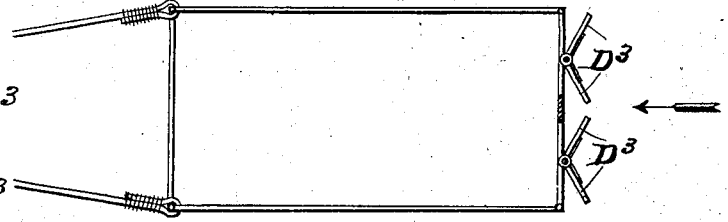

The structure shown in Figs. 6 and 7 differs from those structures described in having two rectangular valves $D^3$ $D^3$, pivoted centrally of each half of the end and held closed by springs E', which surround the door-pivots.

Figure 8:
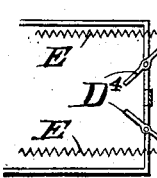

The structure shown in Fig. 8 does not differ materially from those structures described, except that the valves $D^4$ $D^4$ are pivoted a little to one side of their centers, so that pressure upon one side of the pivot counterbalances a large part of the pressure upon the other side and the strain upon the springs is reduced.

In these constructions the principal resistance is due to action of the water against the surfaces of the valves or doors, and the hollow body acts as a rudder to steady the drag and prevent it from swinging laterally. This steadying effect may be obtained by using surfaces of other forms which extend lengthwise the drags or parallel with their line of draft, and I do not, therefore, wish to be limited to the use of such surfaces as are herein shown.

In Figs. 9 and 10 the hollow body C has been omitted and the parts mounted upon a central rod $h$, which is connected with the draft-rope H. In Fig. 9 the rod $h$ has a sleeve K surrounding it and acting as the support for the other parts of the drag. The vanes $D^5$ are pivoted to one end of the sleeve and to brace-rods J, which rods are pivoted at their other ends to a collar L, which slides freely upon the sleeve and is pressed toward the vanes by a spring $E'$, which surrounds the sleeve.

The form shown in Fig. 10 resembles that of Fig. 9. In this, however, the sleeve K is reduced in length and becomes the collar $K'$, the spring is placed between this collar and the collar L, and the vanes $D^6$ are curved. This style is intended to be drawn through the water oppositely to that shown in Fig. 9. In each the direction of impact of the water thereon is shown by the arrow. The curvature of the vanes of Fig. 10 tends to increase its steadiness and prevent side movement. As soon as it begins to swing in one direction the impact of the water upon the vane on that side becomes more nearly normal and the device is forced back to a central line. The steadiness of the device is promoted by giving the vanes a slight backward angle at the minimum ordinary speed.

In using our device we contemplate attaching together a series of these anchors one behind the other after the manner shown in Fig. 12. This, besides reducing the size of the individual drags and making them more convenient to handle, lessens the tendency to swerve off laterally of the line of draft, as the swerving tendency of one drag is likely to be counteracted by an opposite tendency of another. The string may be supported against sinking below the desired depth by buoys, such as I, which are attached thereto at the required intervals. Unless the individual anchors are so constructed as to pull steady without side deflections it is desirable to terminate the string with an anchor which is so constructed, as is shown at $e'$, that its pull will tend to steady those which precede it.

In employing drags such as shown in Figs. 9 and 10, which would ordinarily only have two vanes each, we prefer to attach consecutive drags, so that their vanes extend in different directions, as indicated in Fig. 11, in which $d\ d$ represent the vanes of one drag, and $d'\ d'$ the vanes of the next one in the string.

One of us has already made application for Letters Patent of the United States on a sea-anchor, of which ours is a modification. Said application was filed January 24, 1901, Serial No. 44,498, and nothing is herein claimed which is described in said application.

Having thus fully described our invention, we claim as new and desire to secure by Letters Patent—

1. A sea anchor or drag comprising a series of retarding members attached one behind the other and a steering-surface extending substantially in the line of draft.

2. A sea anchor or drag having a retarding-surface extending across the line of draft and a steering-surface extending substantially in the direction of the line of draft in front of said retarding-surface.

3. In a sea anchor or drag, in combination, the hauling-line H, a steering-surface connected with said hauling-line and extending substantially in the direction of the line of draft and a retarding-surface mounted upon the member containing said steering-surface and extending across the line of draft.

4. A sea anchor or drag having a retarding-surface extending across the line of draft and a steering-surface of larger area than the retarding-surface extending substantially in the direction of the line of draft.

5. A sea anchor or drag having retarding-surfaces extending across the line of draft, and steadying-surfaces extending substantially in the direction of the line of draft.

6. A sea anchor or drag having retarding-surfaces extending across the line of draft, and adjustable in angle by the water-pressure thereon, and steadying-surfaces extending substantially in the direction of the line of draft.

7. A sea anchor or drag having hinged retarding members, springs acting upon said members in opposition to the action of the water thereon, and steadying members opposing side swerving from the line of draft.

8. A sea anchor or drag comprising a hollow body having its forward end open and its rear end closed, and spring-closed valves adapted to permit escape of the water therefrom.

9. A sea anchor or drag comprising a hollow body having its forward end open, and hinged, spring-held members adapted to close its rear end.

10. A sea-anchor comprising a frame having canvas secured thereon to form a hollow body open at its ends, and spring-held members adapted to close its rear end.

11. A sea-anchor comprising a hollow body open at its ends, hinged retarding-plates, and springs acting to hold said plates transversely of the line of draft.

12. A sea anchor or drag having a retarding-surface extending across the line of draft and a steering-surface extending substantially in the line of draft whereby said retarding-surface is prevented from wabbling by the lateral pressure of the water against said steering-surface.

In testimony whereof we have hereunto signed our names to this specification in the presence of the subscribing witnesses.

JOSEPH TEMPERLEY.
JOHN R. TEMPERLEY.
THOMAS SPENCER MILLER.

Witnesses for Joseph and John Ridley Temperley:
H. R. TEMPERLEY,
H. F. FRADGLEY.

Witnesses for Thomas Spencer Miller:
H. L. REYNOLDS,
W. O. PAULING.